United States Patent [19]

Kawaguchi et al.

[11] Patent Number: 5,391,591
[45] Date of Patent: *Feb. 21, 1995

[54] OXYGEN PERMEABLE HARD CONTACT LENS MATERIALS COMPRISING A FLUOROALKYL(SILICON-CONTAINING ALKYL) FUMARATE COPOLYMER

[75] Inventors: Toru Kawaguchi, Gifu; Ichiro Ando, Aichi; Nobuyuki Toyoshima, Nagoya; Yasushi Yamamoto, Takasaki; Hiroshi Yoshioka, Shinagawa; Toshio Yamazaki, Annaka, all of Japan

[73] Assignees: Menicon Co., Ltd., Nagoya; Shin-Etsu Chemical Co., Ltd., Tokyo, both of Japan

[*] Notice: The portion of the term of this patent subsequent to Oct. 5, 2010 has been disclaimed.

[21] Appl. No.: 76,905

[22] Filed: Jun. 15, 1993

Related U.S. Application Data

[63] Continuation-in-part of Ser. No. 895,836, Jun. 9, 1992, Pat. No. 5,250,583.

[30] Foreign Application Priority Data

Oct. 31, 1990 [JP] Japan .................. 2-296327
Jul. 23, 1991 [JP] Japan .................. 3-182267

[51] Int. Cl.$^6$ ............ C08F 222/18; C08F 212/08; C08F 230/08; C08F 220/56
[52] U.S. Cl. .................. 523/107; 523/106; 526/242; 526/279; 526/323; 351/160 H
[58] Field of Search ......... 523/106, 107; 526/242, 526/279, 323; 351/160 H

[56] References Cited

U.S. PATENT DOCUMENTS

| | | | |
|---|---|---|---|
| 4,540,761 | 9/1985 | Kawamura et al. | 526/245 |
| 4,737,558 | 4/1988 | Falcetta et al. | 523/107 |
| 4,868,260 | 9/1989 | Kawaguchi et al. | 526/242 |
| 5,023,305 | 6/1991 | Onozuka et al. | 526/245 |
| 5,162,391 | 11/1992 | Ikari | 523/107 |
| 5,250,583 | 10/1993 | Kawaguchi et al. | 523/107 |

FOREIGN PATENT DOCUMENTS

| | | |
|---|---|---|
| 0219884 | 4/1987 | European Pat. Off. |
| 0294515 | 12/1988 | European Pat. Off. |
| 0425436 | 5/1991 | European Pat. Off. |

Primary Examiner—Paul R. Michl
Assistant Examiner—Andrew E. C. Merriam
Attorney, Agent, or Firm—Armstrong, Westerman, Hattori, McLeland & Naughton

[57] ABSTRACT

An ocular lens material comprising a copolymer prepared by polymerizing a monomer mixture comprising, as main components, (A) 15 to 40% by mole of a fluoroalkyl (silicon-containing alkyl) fumarate, (B) 10 to 50% by mole of a styrenic monomer, (C) 5 to 35% by mole of a hydrophilic monomer, and (D) 0.1 to 20% by mole of a crosslinkable monomer. The ocular lens material is excellent in all of transparency, oxygen permeability, mechanical strength and hardness. Further, the material is excellent in hydrophilic property in spite of its low water absorption.

3 Claims, No Drawings

OXYGEN PERMEABLE HARD CONTACT LENS MATERIALS COMPRISING A FLUOROALKYL(SILICON-CONTAINING ALKYL) FUMARATE COPOLYMER

CROSS-REFERENCE TO RELATED APPLICATION

This is a continuation-in-part of application Ser. No. 895,836 filed on Jun. 9, 1992, now U.S. Pat. No. 5,250,583.

BACKGROUND OF THE INVENTION

The present invention relates to an ocular lens material, and more particularly to an ocular lens material which is high in oxygen permeability and excellent in rigidity and hydrophilic property, and which is suitable for use as contact lenses, intraocular lenses, and the like.

In the field of contact lenses, studies concerning a high oxygen-permeable material have been progressed in recent years. For instance, there have developed contact lenses made of a copolymer comprising, as main components, a siloxanylalkyl methacrylate and methyl methacrylate, contact lenses made of a copolymer comprising, as main components, a siloxanylalkyl methacrylate and a fluoroalkyl methacrylate, and the like.

However, the contact lenses made of these copolymers should be necessarily decreased in the amount of the siloxanylalkyl methacrylate from the viewpoint of hardness and rigidity. Accordingly, it is difficult to obtain contact lenses having high oxygen permeability and excellent mechanical strength.

Also, the contact lenses made of the above-mentioned copolymers are high in water repellency. Accordingly, when a hydrophilic monomer such as methacrylic acid, 2-hydroxyethyl methacrylate or N-vinylpyrrolidone is used in a large amount for giving hydrophilic property, the water absorbancy of an obtained contact lens material improves, but the shape stability of contact lenses made thereof is impaired.

In order to solve the above-mentioned defects, as a hard contact lens material, for instance, an alternating copolymer comprising N-vinyl lactam and fumarate or maleate has been proposed (Japanese Unexamined Patent Publication No. 99913/1991 ). The hard contact lens material is a copolymer containing about 50% by mole of N-vinyl lactam, and is low in water absorption and relatively excellent in hydrophilic property. However, for improving the oxygen permeability, a large amount of a silicon-containing fumarate or a silicon-containing maleate must be used as the fumarate or maleate component, thus resulting in lowering of the hardness and hydrophilic property of the material.

An object of the present invention is to provide an ocular lens material which is simultaneously excellent in all of oxygen permeability, mechanical strength and hardness, and moreover excellent in hydrophilic property in spite of its low water absorption.

This and other objects of the present invention will become apparent from the following description.

SUMMARY OF THE INVENTION

In accordance with the present invention, there is provided an ocular lens material comprising a copolymer prepared by polymerizing a monomer mixture comprising, as main components, (A) 15 to 40% by mole of a fluoroalkyl (silicon-containing alkyl) fumarate,
(B) 10 to 50% by mole of a styrenic monomer,
(C) 5 to 35% by mole of a hydrophilic monomer, and
(D) 0.1 to 20% by mole of a crosslinkable monomer.

DETAILED DESCRIPTION

The ocular lens material of the present invention is, as mentioned above, composed of the copolymer prepared by polymerizing the monomer mixture comprising, as the main components, (A) 15 to 40% by mole of the fluoroalkyl (silicon-containing alkyl) fumarate,
(B) 10 to 50% by mole of a styrenic monomer,
(C) 5 to 35% by mole of a hydrophilic monomer, and
(D) 0.1 to 20% by mole of the crosslinkable monomer.

The fluoroalkyl (silicon-containing alkyl) fumarate (A) has a fluoroalkyl group and a silicon-containing alkyl group in its molecule, so it is a component effective for improving the oxygen permeability of the copolymer. Typical examples of the fluoroalkyl (silicon-containing alkyl) fumarate (A) are, for instance, a compound represented by the formula (I):

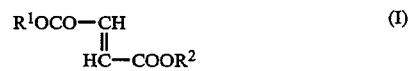

wherein $R^1$ is a group :

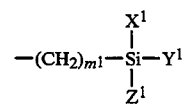

in which $X^1$, $Y^1$ and $Z^1$ are the same or different and each is —$CH_3$ or

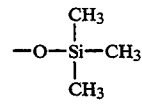

and $m^1$ is 1 or 3; and $R^2$ is a group: —$(CH_2)_k$—$C_aH_b$-$F_{2a+1-b}$ in which k is 0 or an integer of 1 to 3, a is an integer of 1 to 12 and b is 0 or 1; and the like. Concrete examples of the fluoroalkyl (silicon-containing alkyl) fumarate (A) are, for instance, trifluoroethyl (trimethylsilylmethyl) fumarate, trifluoroethyl (3-(trimethylsilyl)propyl) fumarate, hexafluoroisopropyl (trimethylsilylmethyl) fumarate, hexafluoroisopropyl (3-(trimethylsilyl)propyl) fumarate, octafluoropentyl (trimethylsilylmethyl) fumarate, octafluoropentyl (3-(trimethylsilyl)propyl) fumarate, trifluoroethyl ((dimethyl(trimethylsiloxy)silyl)methyl) fumarate, trifluoroethyl (3-(dimethyl(trimethylsiloxy)-silyl)propyl) fumarate, hexafluoroisopropyl ((dimethyl(trimethylsiloxy)silyl)methyl) fumarate, hexafluoroisopropyl (3-(dimethyl(trimethylsiloxy)silyl)propyl) fumarate, octafluoropentyl ((dimethyl(trimethylsiloxy)silyl)methyl) fumarate, octafluoropentyl (3-(dimethyl(trimethylsiloxy)silyl)propyl) fumarate, trifluoroethyl ((methylbis(trimethylsiloxy)silyl)methyl) fumarate, trifluoroethyl (3-(methylbis(trimethylsiloxy)silyl)propyl) fumarate, hexafluoroisopropyl ((methylbis(trimethylsiloxy)silyl)methyl) fumarate, hexafluoroisopropyl (3-(methylbis(- trimethylsiloxy)silyl)propyl) fumarate, octafluoropentyl ((methylbis(trimethylsiloxy)silyl)methyl) fumarate, octafluoropentyl (3-(methylbis(trimethylsiloxy)silyl)propyl) fumarate, trifluoroethyl ((tris(trimethylsiloxy)silyl)methyl) fumarate, trifluoroethyl (3-(tris(trimethylsiloxy)silyl)propyl) fumarate, hexafluoroisopropyl ((tris(trimethylsiloxy)silyl)methyl) fumarate, hexafluoroisopropyl (3-(tris(trimethylsiloxy)silyl)propyl) fumarate, octafluoropentyl ((tris(trimethylsiloxy)silyl)methyl) fumarate, octafluoropentyl (3-(tris(trimethylsiloxy)silyl)propyl) fumarate, tridecafluoroheptyl (trimethylsilylmethyl) fumarate, tridecafluoroheptyl (3-(trimethylsilyl)propyl) fumarate, pentadecafluorononyl (trimethylsilylmethyl) fumarate, pentadecafluorononyl (3-(trimethylsilyl)propyl) fumarate, heneicosafluorododecyl (trimethylsilylmethyl) fumarate, heneicosafluorododecyl (3-(trimethylsilyl)propyl) fumarate, tridecafluoroheptyl ((dimethyl(trimethylsiloxy)silyl)methyl) fumarate, tridecafluoroheptyl (3-(dimethyl(trimethylsiloxy)silyl)propyl) fumarate, pentadecafluorononyl ((dimethyl(trimethylsiloxy)silyl)methyl) fumarate, pentadecafluorononyl (3-(dimethyl(trimethylsiloxy)silyl)propyl) fumarate, heneicosafluorododecyl ((dimethyl(trimethylsiloxy)silyl)methyl) fumarate, heneicosafluorododecyl (3-(dimethyl(trimethylsiloxy)silyl)propyl) fumarate, tridecafluoroheptyl ((methylbis(trimethylsiloxy)silyl)methyl) fumarate, tridecafluoroheptyl (3-(methylbis(trimethylsiloxy)silyl)propyl) fumarate, pentadecafluorononyl ((methylbis(trimethylsiloxy)silyl) methyl) fumarate, pentadecafluorononyl (3-(methylbis(trimethylsiloxy)silyl)propyl) fumarate, heneicosafluorododecyl ((methylbis(trimethylsiloxy)silyl)methyl) fumarate, heneicosafluorododecyl (3-(methylbis(trimethylsiloxy)-silyl)propyl) fumarate, tridecaftuoroheptyl ((tris(trimethylsiloxy)silyl)methyl) fumarate, tridecafluoroheptyl (3-(tris(trimethylsiloxy)silyl)propyl) fumarate, pentadecafluorononyl ((tris(trimethylsiloxy)silyl)methyl) fumarate, pentadecafluorononyl (3-(tris(trimethylsiloxy)silyl)propyl) fumarate, heneicosafluorododecyl ((tris(trimethylsiloxy)silyl)methyl) fumarate, heneicosaftuorododecyl (3-(tris(trimethylsiloxy)silyl)propyl) fumarate, and the like.

The fluoroalkyl (silicon-containing alkyl) fumarate (A) is poor in homopolymerizability, however, the fumarate (A) is easily copolymerized with the styrenic monomer (B). For this reason, the styrenic monomer (B) is used for copolymerizing with the fumarate (A).

Typical examples of the styrenic monomer (B) are, for instance, a compound represented by the formula (II):

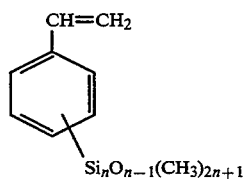

wherein n is an integer of 1 to 4, a compound represented by the formula (III):

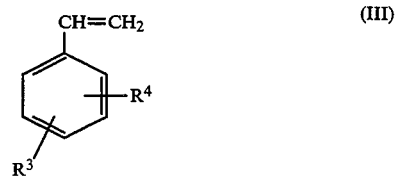

wherein each of $R^3$ and $R^4$ is independently hydrogen atom, or a linear or branched alkyl group having a formula: $C_mH_{2m+1}$ in which m is an integer of 1 to 8, and the like.

Concrete examples of the styrenic monomer (B) are, for instance, trimethylsilyl styrene, pentamethyldisiloxanyl styrene, heptamethyltrisiloxanyl styrene, nonamethyltetrasiloxanyl styrene such as p-tris(trimethylsiloxylsilyl) styrene, styrene, p-methyl styrene, m-methyl styrene, p-tert-butyl styrene, m-tert-butyl styrene, p-1,1,3,3-tetramethylbutyl styrene, p-trimethylsilyl styrene, and the like. Among them, trimethylsilyl styrene and tert-butyl styrene are particularly preferable since these styrenic monomers improve oxygen permeability and do not lower hardness.

As mentioned above, since the fluoroalkyl (silicon-containing alkyl) rumstate (A) is poor in homopolymerizability, the styrenic monomer (B) is used for copolymerizing the rumstate (A). Accordingly, it is necessary that the amount of the styrenic monomer (B) is larger than that of the fumarate (A).

When an N-vinyl lactam is used as the hydrophilic monomer (C), it is necessary that the amount of the fumarate (A) is at most the total amount of the styrenic monomer (B) and the N-vinyl lactam.

When a vinylbenzyl group-containing monomer is used as a crosslinkable monomer (D), the total amount of the styrenic monomer (B) and the vinylbenzyl group-containing monomer should be adjusted so that the total amount is greater than the amount of the fluoroalkyl (silicon-containing alkyl) fumarate.

It is desired that the amount of the fluoroalkyl (silicon-containing alkyl) fumarate (A) is from 15 to 40% by mole of the total monomers to be polymerized, preferably from 20 to 35% by mole of the total monomers. When the amount of the fluoroalkyl (silicon-containing alkyl) fumarate (A) is less than 15% by mole, the resulting ocular lens material becomes low in oxygen permeability. On the other hand, when the amount of the fumarate (A) is more than 40% by mole, the hardness of the obtained ocular lens material is remarkably lowered.

The amount of the styrenic monomer (B) is from 5 to 50% by mole of the total monomers to be polymerized, preferably from 5 to 45% by mole of the total monomers.

The ocular lens material of the present invention contains a hydrophilic monomer (C) in addition to the components (A) and (B). The hydrophilic monomer (C) can improve hydrophilic property of the ocular lens material. It is preferable that the amount of the hydrophilic monomer (C) is from 5 to 35% by mole of the total monomer content to be polymerized, more preferably from 10 to 30% by mole of the total monomer content. When the amount of the hydrophilic monomer (C) is less than 5% by mole, the resulting ocular lens material becomes poor in hydrophilic property. On the other hand, when the amount of the hydrophilic monomer (C) is more than 35% by mole, the resulting ocular lens material is high in water absorption and the lenses made thereof become poor in shape stability.

Examples of the hydrophilic monomer (C) are, for instance, a (meth)acrylamide monomer such as N, N-dimethyl (meth)acrylamide, (meth)acrylamide, N, N-diethyl (meth)acrylamide, N-hydroxyethyl (meth)acrylamide, N-ethyl-N-aminoethyl (meth)acrylamide, N-methyl (meth)acrylamide, N-ethyl (meth)acrylamide, an N-vinyllactum such as N-vinyl-2-pyrrolidone, N-vinyl-3-methylpyrrolidone, N-vinyl-5-methylpyrrolidone, N-vinyl-3,3,5-trimethylpyrrolidone, N-vinyl-5-phenylpyrrolidone, N-vinyl-3-benzylpyrrolidone, N-vinyl piperidone, N-vinyl caprolactam or N-vinyl capryllactam, 2-hydroxyethyl (meth)acrylate, 2-hydroxybutyl (meth)acrylate, (meth)acrylic acid, and the like.

The crosslinkable monomer (D) can improve chemical resistance as well as hardness and mechanical strength of ocular lenses, thereby stabilizing the standard or shape of, for instance, contact lenses and the like. Examples of the crosslinkable monomer (D) are, for instance, diallyl fumarate, allyl (meth)acrylate, trimethylolpropane tri(meth)acrylate, ethylene glycol di(meth)acrylate, divinyl benzene, vinylbenzyl (meth)acrylate, and the like. The crosslinkable monomer (D) may be used alone or in an admixture thereof.

When a monomer other than the N-vinyl lactam is used as the hydrophilic monomer (C), it is desired that vinylbenzyl (meth)acrylate is used as the crosslinkable monomer (D) to give an optically transparent copolymer.

It is preferable that the amount of the crosslinkable monomer (D) is from 0.1 to 20% by mole of the total monomers to be polymerized, more preferably from 5 to 15% by mole of the total monomers. When the amount of the crosslinkable monomer (D) is more than 20% by mole, an obtained ocular lens material becomes brittle. On the other hand, when the amount of the monomer (D) is less than 0.1% by mole, the obtained material is poor in chemical resistance as well as hardness and mechanical strength.

In the present invention, the following various monomers can be suitably admixed with the above-mentioned monomer components so that an obtained ocular lens material has desired properties.

Examples of the monomers which may be added thereto are, for instance, an alkyl (meth)acrylate such as methyl (meth)acrylate, ethyl (meth)acrylate, n-propyl (meth)acrylate, i-propyl (meth)acrylate, n-butyl (meth)acrylate, i-butyl (meth)acrylate, sec-butyl (meth)acrylate, or t-butyl (meth)acrylate; a silicon-containing alkyl (meth)acrylate such as trimethylsilylmethyl (meth)acrylate, 3-(trimethylsilyl)-propyl (meth)acrylate, (dimethyl(trimethyl-siloxy)silyl) methyl (meth)acrylate, 3-(dimethyl(trimethylsiloxy)silyl)propyl (meth)acrylate, (methylbis(trimethylsiloxy)silyl)methyl (meth)acrylate, 3-(methylbis(trimethylsiloxy)silyl)propyl (meth)acrylate, (tris(trimethylsiloxy)silyl)methyl (meth)acrylate, or 3-(tris(trimethylsiloxy)silyl)propyl (meth)acrylate; a fluoroalkyl (meth)acrylate such as trifluoroethyl (meth)acrylate, tetrafluoropropyl (meth)acrylate, pentafluoropropyl (meth)acrylate, hexafluoroisopropyl (meth)acrylate, hexafluorobutyl (meth)acrylate, octafluoropentyl (meth)acrylate, 2,3,4,5,5,5-hexafluoro-2,4-bis(trifluoromethyl)pentyl (meth)acrylate or dodecafluoroheptyl (meth)acrylate; a dialkyl fumarate such as di-i-propyl fumarate, di-t-butyl fumarate, i-propyl(t-butyl) fumarate, dicyclohexyl fumarate, or cyclohexyl(t-butyl) fumarate; a bis(silicon-containing alkyl) fumarate such as bis(3-(trimethylsilyl)propyl) fumarate, bis(3-(dimethyl(trimethylsiloxy)silyl)propyl) fumarate, bis(3-(methylbis(trimethylsiloxy)silyl)propyl) fumarate, or bis(3-(tris(trimethylsiloxy)silyl)propyl) fumarate; an alkyl (silicon-containing alkyl) fumarate such as i-propyl (3-(trimethylsilyl)propyl) fumarate, cyclohexyl (3-(trimethylsilyl)propyl) fumarate, i-propyl (3-(dimethyl(trimethylsiloxy)silyl)propyl) fumarate, cyclohexyl (3-(dimethyl(trimethylsiloxy)silyl)propyl) fumarate, i-propyl (3-(methylbis(trimethylsiloxy)silyl)propyl) fumarate, cyclohexyl (3-(methylbis(trimethylsiloxy)silyl)propyl) fumarate, i-propyl (3-(tris(trimethylsiloxy)silyl)propyl) fumarate, or cyclohexyl (3-(tris(trimethylsiloxy)silyl)propyl) fumarate, and the like. These monomers may be used alone or in an admixture thereof.

The amount of the other monomers as mentioned above varies depending on the desired physical properties of the ocular lens material, and cannot be generally decided. Usually, the amount of the other monomers is adjusted so that the other monomers are contained in the total monomer content of not more than 40% by mole, preferably not more than 30% by mole. When the amount of the other monomers is more than 40% by mole, the amounts of the essential components are relatively decreased, and the effects obtained by using the essential components can be insufficiently exhibited.

Any polymerization manners usually conducted in the art can be applied to the polymerization method of the copolymer according to the present invention without particular limitations. For instance, there is cited a method wherein the polymerization is conducted at room temperature to about 130° C., using a radical polymerization initiator used typically for the polymerization of a vinyl monomer. Examples of the radical polymerization initiator are, for instance, benzoyl peroxide, azobisisobutyronitrile, azobisdimethylvaleronitrile, and the like. The initiators may be used alone or in an admixture thereof. The amount of the radical polymerization initiator is from 0.01 to 1 part by weight based on 100 parts by weight of the total monomer content to be polymerized.

The ocular lens material of the present invention can be formed into desired ocular lenses in a usual manner. For instance, when obtaining contact lenses as the ocular lens, the polymerization is conducted in a mold having a shape corresponding to that of a contact lens to directly give the shape of contact lens, followed by, as occasion demands, mechanical processing finish. Also, the polymerization is conducted in a suitable mold or vessel to give a material in the state of a plate or bar, followed by a usual mechanical process such as cutting or polishing.

The present invention is more specifically described and explained by means of the following Examples wherein all per cents and parts are by weight unless otherwise noted. It is to be understood that the present invention is not limited to the Examples, and various changes and modifications may be made in the invention without departing from its spirit and scope.

EXAMPLE 1

There were mixed 25 moles of 2,2,2-trifluoro-1-trifluoromethylethyl (3-(tris(trimethylsiloxy)silyl)propyl) fumarate (F6S4F), 20 moles of p-tert-butyl styrene, 20 moles of N, N-dimethylacrylamide, 10 moles of 4-vinylbenzyl methacrylate and 25 moles of methyl methacrylate, then, as a polymerization initiator, 2,2′-azobis(2,4-dimethylvaleronitrile) (V-65) was added thereto in an amount of 0.1 part based on 100 parts of the mixture of the monomers to be polymerized, and were thoroughly stirred.

After a glass test tube was charged with the monomer mixture, air dissolved in the monomer mixture was removed. The space of the tube was replaced with nitrogen gas, and the glass test tube was sealed. The sealed tube was allowed to stand in a water bath at 35° C. for 40 hours, then at 50° C. for 8 hours to polymerize, then was heated in a dry oven at 60° C. for 1.5 hours, at 70° C. for 1.5 hours, at 80° C. for 1.5 hours, at 90° C. for 1.5 hours, at 100° C. for 1.5 hours, at 110° C. for 1.5 hours and finally at 120° C. for 3 hours to complete the polymerization.

The obtained copolymer was subjected to cutting to give test specimens for measuring the following various physical properties. The results are shown in Table 1.

(Oxygen permeability)

Using a Yanagimoto gas permeater GTR-30R commercially available from Kabushiki Kaisha Yanagimoto Seisakusho, the oxygen permeability [cc.cm/(cm$^2$.sec.mmHg)] of a test specimen having a diameter of 12.7 mm and a thickness of 0.5 mm is measured at 35° C. according to a pressure method.

(Shore D hardness)

Using a Durometer GS-702 commercially available from Teclock Corporation, the Shore D hardness of a test specimen having a diameter of 12.7 mm and a thickness of 4.0 mm is measured in an air-conditioned room at 25° C. under 50% RH (relative humidity).

(Impact strength)

A steel ball having a weight of 6.75 g was dropped on a test piece having a thickness of 0.5 min. When the test piece was broken, the height (mm) of the steel ball from the test piece was measured.

(Contact angle)

The contact angle of a specimen having a diameter of 12.7 mm and a thickness of 4.0 mm, both sides of which are polished is measured according to a bubble method.

(Water absorption)

The water absorption is calculated by the following formula.

$$\text{(Water absorption (\%))} = \frac{\text{(Weight of the test specimen dipped in water for 72 hours) (g)} - \text{(Weight of the test specimen dried at 50° C. for 24 hours) (g)}}{\text{(Weight ot the test specimen dried at 50° C. for 24 hours) (g)}} \times 100$$

(Appearance)

A test specimen is observed with the naked eye.

EXAMPLES 2 to 9

Copolymers were prepared in the same manner as in Example 1 except that monomers to be copolymerized were changed to those shown in Table 1, and the physical properties were measured in the same manner as in Example 1. In the polymerizations of all Examples 2 to 9, V-65 was used as a polymerization initiator in an amount of 0.1 part based on 100 parts of the monomer mixture.

Codes used in Table 1 are as follows:
F6S4F: 2,2,2-Trifluoro-1-trifluoromethylethyl (tris-(trimethylsiloxy)silylpropyl)fumarate
t-BuSt: p-tert-butyl styrene
TMSSt: p-trimethylsilyl styrene
DMAA: N, N-dimethylacrylamide
MMA: Methyl methacrylate
MAA: Methacrylic acid
3FEMA: 2,2,2-trifluoroethyl methacrylate
NVP: N-vinyl-2-pyrrolidone
EDMA: Ethyleneglycol dimethacrylate
VBMA: 4-vinylbenzyl methacrylate

TABLE 1

| Monomer mixture | Ex. No. | | | | | | | | |
| --- | --- | --- | --- | --- | --- | --- | --- | --- | --- |
| | 1 | 2 | 3 | 4 | 5 | 6 | 7 | 8 | 9 |
| Fluoroalkyl (silicon-containing alkyl) fumarate (moles) | F6S4F (25) | F6S4F (25) | F6S4F (25) | F6S4F (25) | F6S4F (25) | F6S4F (25) | F6S4F (25) | F6S4F (26) | F6S4F (20) |
| Styrenic monomer (moles) | t-BuSt (20) | t-BuSt (15) | t-BuSt (25) | t-BuSt (40) | TMSSt (25) | t-BuSt (15) | t-BuSt (40) | t-BuSt (22) | t-BuSt (30) |
| Hydrophilic monomer (moles) | DMAA (20) | DMAA (25) | DMAA (25) | DMAA (15) | DMAA (25) | DMAA(15) MAA (10) | MAA (15) | NVP (7) DMAA(18) | DMAA (30) |
| Crosslinkable monomer (moles) | VBMA (10) | VBMA (10) | VBMA (10) | VBMA (10) | VBMA (10) | VBMA (10) | VBMA (10) | EDMA (9) | VBMA (10) |
| Other monomer (moles) | MMA (25) | MMA (25) | MMA (15) | MMA (10) | MMA (15) | MMA (25) | 3FEMA (10) | MMA(9) 3FEMA(9) | MMA (10) |
| Oxygen permeability ($\times 10^{-11}$) | 101 | 98 | 109 | 117 | 117 | 97 | 128 | 109 | 80 |
| Shore D hardness (—) | 78 | 77 | 78 | 78 | 77 | 76 | 79 | 74 | 80 |
| Impact strength (mm) | 46 | 37 | 41 | 40 | 38 | 35 | 40 | 37 | 48 |
| Contact angle (degree) | 65 | 59 | 64 | 72 | 63 | 63 | 75 | 66 | 59 |
| Water absorption (%) | 0.8 | 1.1 | 1.0 | 0.4 | 1.0 | 0.8 | 0.2 | 0.5 | 1.4 |
| Appearance | ◯ | ◯ | ◯ | ◯ | ◯ | ◯ | ◯ | ◯ | ◯ |

(Note)
◯: Transparent

COMPARATIVE EXAMPLE 1

A copolymer was prepared in the same manner as in Example 1 except that F6S4F was not used. The oxygen permeability of the obtained copolymer was $9 \times 10^{-11}$ (cc.cm/(cm$^2$.sec.mmHg)) which shows that the copolymer had small oxygen permeability.

COMPARATIVE EXAMPLE 2

A copolymer was prepared in the same manner as in Example 1 except that t-BuSt was not used. The obtained copolymer was cloudy and unsuitable for use as ocular lens materials.

COMPARATIVE EXAMPLE 3

A copolymer was prepared in the same manner as in Example 1 except that DMAA was not used. The obtained copolymer had a contact angle of 86° which shows that the copolymer had poor hydrophilic property.

COMPARATIVE EXAMPLE 4

A copolymer was prepared in the same manner as in Example 1 except that VBMA was not used. The obtained copolymer had a Shore D hardness of 72 and was cloudy, which shows that the copolymer was unsuitable for use as ocular lens materials.

In addition to the ingredients used in the Examples, other ingredients can be used in the Examples as set forth in the specification to obtain substantially the same results.

What we claim is:

1. An ocular lens material comprising a copolymer prepared by polymerizing a monomer mixture comprising, as main components,
   (A) 15 to 40% by mole of a fluoroalkyl (silicon-containing alkyl) fumarate,
   (B) 10 to 50% by mole of a styrenic monomer,
   (C) 5 to 35% by mole of a hydrophilic monomer, and
   (D) 0.1 to 20% by mole of a crosslinkable monomer.

2. The material of claim 1, wherein said hydrophilic monomer is a (meth)acrylamide monomer.

3. The material of claim 1, wherein said crosslinkable monomer is vinylbenzyl (meth)acrylate.

* * * * *